Jan. 23, 1945.   C. C. HEIN   2,367,943

COPPER OXIDE RECTIFIER FOR AUTOMOBILES

Filed July 12, 1940

WITNESSES:

INVENTOR
Carl C. Hein.
BY
ATTORNEY

Patented Jan. 23, 1945

2,367,943

UNITED STATES PATENT OFFICE 2,367,943

COPPER OXIDE RECTIFIER FOR AUTOMOBILES

Carl C. Hein, Forest Hills, Pa., assignor to Westinghouse Electric & Manufacturing Company, East Pittsburgh, Pa., a corporation of Pennsylvania Application July 12, 1940, Serial No. 345,086

9 Claims. (Cl. 175—366)

My invention relates to contact rectifiers and, in particular, to an arrangement for reducing the space and initial cost of such rectifiers.

One object of my invention is to provide a rectifier adapted to draw power from a polyphase alternating-current source in the form of a single plate of metal provided with rectifying contacts on its opposite faces.

Another object of my invention is to reduce the number of separate parts which must be provided in a contact rectifier adapted to draw current from a polyphase alternating-current source.

A third object of my invention is to provide a contact rectifier drawing current from a polyphase alternating-current source which shall be much more compact and embody within a single plate many of the electrical interconnections which have been provided as separate leads in similar rectifiers of the prior art.

Still another object of my invention is to provide a rectifier of the oxidized copper type in which a single oxidized plate is able to provide a rectified current output to a 7.5 volt load per plate for a single plate three phase rectifier and to a 20 volt per plate for three phase six plate rectifiers (full wave bridge).

A still further object of my invention is to provide a contact rectifier in the form of a single plate having rectifying contacts on its opposite faces which shall be adapted for use for battery charging and other purposes on automobiles by drawing current from an alternating-current generator driven by the automobile engine.

Still other objects of my invention will become evident from reading the following specification taken in conjunction with the attached drawing, in which.

Figures 1, 2:
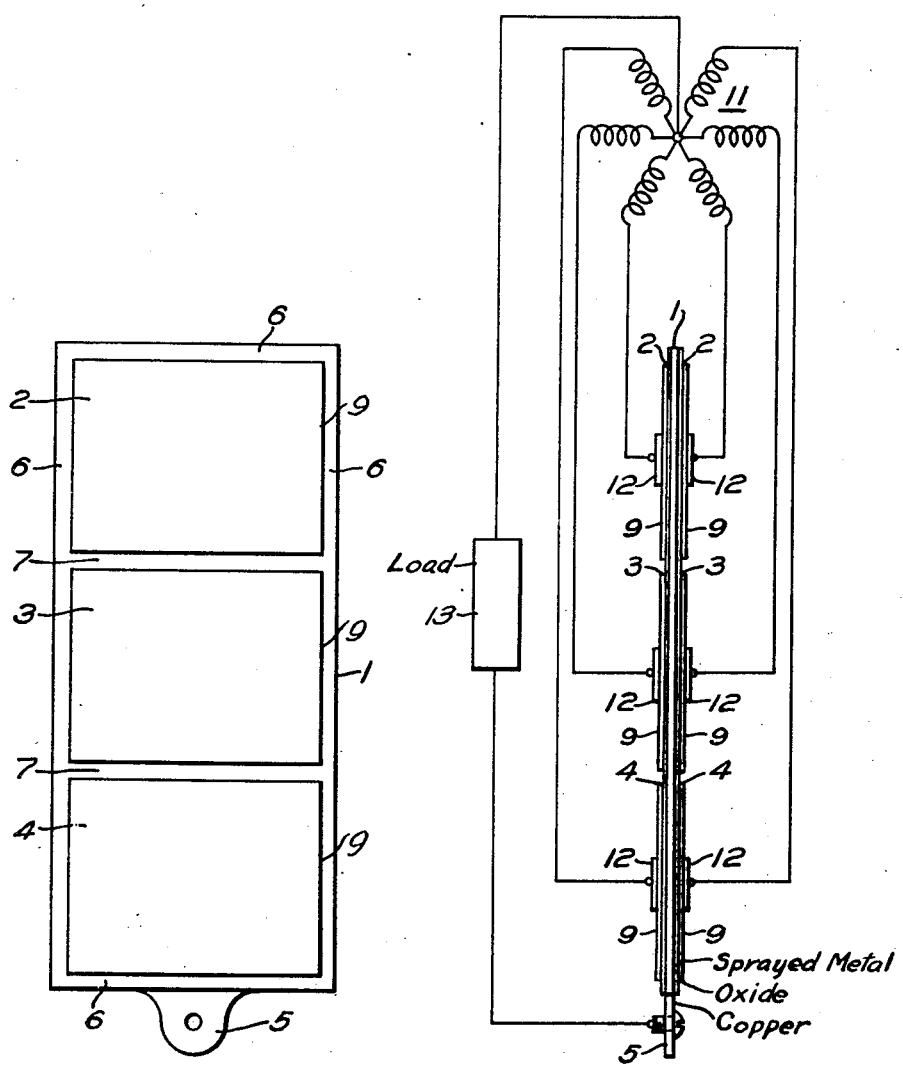
Figure 1 illustrates the plate rectifier element of my invention.
Fig. 2 represents an edge view of the same rectifier plate with a diagrammatic showing of its connections to a six-phase alternating-current generator and a load.

It has previously been attempted to replace the direct-current charging generators employed on automobiles by alternating-current generators provided with rectifiers of the copper oxide, copper hemi-sulphide, selenium and other types. For such service, it is obviously necessary to keep the weight, the size, and the cost of both the electric generator and the rectifier to a minimum in order to compete commercially with the direct-current generators heretofore used. With these purposes in mind, it is desirable to wind the generator as a polyphase machine, and direct-current outputs of the order of 30 amperes and output voltages of at least 7 volts are required in practice. In employing copper oxide rectifiers made in accordance with the practice heretofore standard in the art and substantially as described in Grondahl Patent No. 1,640,335, it has been found necessary to use six oxidized copper plates in the rectifier, together with the necessary interconnecting leads and structural parts for joining them together. I have discovered that by a method described in my copending application, Serial No. 286,613, filed July 26, 1939, now Patent No. 2,304,090, December 8, 1942, and assigned to Westinghouse Electric & Manufacturing Company, of East Pittsburgh, Pa., it is posisble to produce copper-oxide rectifiers capable of withstanding greatly increased alternating-current and direct-current output voltages, so that a single copper-copper oxide junction is capable of supplying direct-current to a 20 volt direct-current load using types of heat dissipation now standard in the copper oxide rectifier art.

I have further found that the above-mentioned process makes it possible to oxidize a single plate 1 of copper, say 10 inches by $4\frac{7}{8}$ inches by 0.05 inch, on both sides, thereafter subdividing each side into three separate areas 2, 3, 4, by coating the outside of the oxide with conductor coatings separated from each other by narrow strips forming two transverse paths, as illustrated in Fig. 1, thereby providing a single plate, a rectifier which may be connected to a six-phase generator, in the manner illustrated in Fig. 2, to supply an output current of 30 amperes continuously to a 7.5 volt load employing forced ventilation at approximately 1000 feet per minute. By this arrangement employing a single rectifier plate, the interconnecting structural elements which it was necessary to employ where six separate rectifier plates were used have largely been dispensed with, and the space occupied by the rectifier and its assembly parts has been greatly reduced, correspondingly the initial cost has been greatly decreased.

Referring particularly to Fig. 1, a single copper plate 1, which, to take one example, may be 10 inches by $4\frac{7}{8}$ inches by 0.05 inch, is first cleansed of grease by the application of carbon tetrachloride. The base is then dipped into concentrated nitric acid, and rinsed in distilled water. After the acid treatment, the base is disposed in a vessel which is highly evacuated and heated for three hours at a temperature of from 900° C. to 1000° C. The pressure in the vessel is maintained at less than 1 micron and should preferably be less than 0.1 micron.

During the course of the treatment, the metal gives up a number of impurities in its surface and particularly lead. The impurities are emitted in a vaporous state, and will, of course, materially increase the pressure. For this reason, it is necessary that the vessel within which the plates are disposed be continuously pumped. While a pressure less than 0.1 micron has been found to yield the most satisfactory results, I have at times obtained satisfactory rectifiers with the pressure during the treatment somewhat higher. However, in no event should the pressure be greater than 30 microns.

In the customary practice of my invention, the blanks are now oxidized in another furnace. Accordingly, after the three hour treatment, the evacuated container is reduced to room temperature and the blanks are removed and placed in an oxidizing furnace. Here, the blanks are again heated and air or oxygen, preferably at atmospheric pressure, is applied. The oxidizing heating is at a temperature of from 1020° to 1030° C. and the treatment continues for 13 minutes. Of course, where convenient, the oxidizing treatment may be carried out in the same furnace as the vacuum treatment. In such a case, it is unnecessary to reduce the blanks to room temperature before oxidizing them.

After the 13 minute oxidizing treatment, the blanks are annealed at 500° C. for 13 minutes and then quenched in cold water. Thereafter the plate is washed in a water solution containing 2% sulphuric acid, 0.1% hydrochloric acid at 80° C., then washed with tap water and dipped in concentrated nitric acid. It is then again washed in tap water and dried by any convenient method, such as a blast of hot air. The lug 5 which is to furnish electrical contact from the copper plate to the load line conductor is then sandblasted until free of copper oxide. The areas 2, 3, 4, which are to constitute the active rectifying surfaces are then coated with aquadag, the strips 6 around the edges of the plate and the two cross paths 7 separating the middle area from the two end areas being masked by a thin wooden or other convenient frame to keep them free from the aquadag. The latter is then thoroughly dried and the aquadag surface on the areas 2, 3, 4, is then sprayed with a lead-tin alloy 9 melting at about 180° C.; this provides a contact for circuit lead wires to the outer face of the oxide layer on the areas. As an alternative to the aquadag and metal-spraying process just described, the plate, masked as just described, is electrolytically reduced in a thin layer on the outer surface of the oxide in a bath consisting of 0.1% ammonium bicarbonate. It is then washed and transferred to a nickel plating bath where a nickel deposit is produced on the outside of the reduced copper, thereby providing contact for line wires to each of the areas.

The plate unit, made up as above described, may then be connected to line wires in the manner indicated in Fig. 2. Leads from each terminal of a six-phase generator 11 are connected to metal strips 12 which are held by insulated clamps against the respective faces of the rectifying areas 2, 3, 4. The load 13 is connected between the neutral point of the generator and the contact lug 5 on the rectifier plate.

While I have specifically described a copper oxide rectifier, it will be recognized that the same objectives of compactness, cheapness and reduction in the number of parts may be attained by employing the process of this single plate construction in the case of selenium rectifiers and copper hemi-sulphide rectifiers. A patent which described selenium rectifiers of the type referred to is No. 2,193,610 to E. D. Wilson. The selenium corresponds to the oxide described above and the steel plate of Wilson bears the same structural relation to the other elements as does the copper plate above, although the rectification in the selenium rectifier differs from that in the copper oxide rectifier in taking place at the junction of the selenium with the sprayed metal. It will also be recognized that, while I have described a six-phase generator and rectifier, the principles described may be applied to rectifiers of any other number of phases, even including single phase, the diametrically opposite phase terminals being preferably, but not necessarily, connected to opposing oxide areas on opposite sides of the rectifier plate, and the neutral point of the alternating-current source being connected to the positive terminal of the load. The number of separate contact areas on the rectifier plate would, in general, be equal to the number of phase terminals of the alternating-current source. It will also be recognized that, while I have described a plate with contact areas on both sides, it is within the scope of my invention to use contact areas on only one side of the plate for any type of contact rectifier or dry rectifier.

While I have described above a specific embodiment of my invention, it will be apparent to those skilled in the art that its principles may be applied in other ways which will be evident to them.

I claim as my invention:

1. In combination with an alternating-current source having a neutral point and $n$ phase terminals, a load having one terminal connected to said neutral point, a metal plate having at least one side provided with a surface layer having a unilaterally conductive junction with the mother-metal of the plate, contact-making layers separated from each other by gaps at $n$ different areas of the surface of said layer, $n$ connections leading, respectively, from one of said phase terminals to one of said contact-making layers, and a connection from the other terminal of said load to the mother-metal of said plate.

2. In combination with an alternating-current source having a neutral point and an even number of phase terminals, a load having one terminal connected to said neutral point, a metal plate having its opposite sides each provided with a surface layer having a unilaterally conductive junction with the mother-metal of the plate, contact-making layers separate from each other and equal in number to half the number of phase terminals on separate areas of the surface layer on each side of said plate, connections leading from the contact-making layers on one side of said plate to one half of said phase terminals, connections leading from the contact-making layers on the other side of said plate to the remainder of said phase terminals, and a connection from the other terminal of said load to the mother-metal of said plate.

3. A contact rectifier comprising a body of mother-metal having a surface layer forming a unilaterally conductive junction with said mother-metal and forming a continuously-extending surface, and a plurality of contact-making layers separate from each other covering separated areas on said surface.

4. A contact rectifier comprising a body of mother-metal having a surface layer forming a unilaterally conductive junction with said mother-metal and forming a continuously-extending surface, a plurality of contact-making layers separate from each other covering separated areas on said surface, and means for making electrical contact to said mother-metal.

5. A contact rectifier comprising a plate of mother-metal having on its opposite sides surface layers which form unilaterally conductive junctions with said mother-metal, a plurality of contact-making areas on different portions of said surface layers, the contact-making junctions on one side of said plate being separate and insulated from the contact-making layers on the other side of said plate, and means for making an electrical contact to said mother-metal.

6. A contact rectifier comprising a plate of mother-metal having on its opposite sides surface layers which form unilaterally conductive junctions with said mother-metal, a plurality of contact-making layers separate from each other on the respective surface layers on opposite sides of said plate, and means for making electrical connection to said mother-metal.

7. In combination with an alternating-current source having a neutral point and $n$ phase terminals, a load having one terminal connected to said neutral point, a copper plate having at least one side provided with an oxidized surface layer having a unilaterally conductive junction with the mother-metal of the plate, contact-making layers separated from each other by gaps at $n$ different areas of the surface of said layer, $n$ connections leading, respectively, from one of said phase terminals to one of said contact-making layers, and a connection from the other terminal of said load to the mother-metal of said plate.

8. A contact rectifier comprising a body of copper mother-metal having an oxidized surface layer forming a unilaterally conductive junction with said mother-metal and forming a continuously-extending surface, and a plurality of contact-making layers separate from each other covering separated areas on said surface.

9. A contact rectifier comprising a plate of copper mother-metal having on its opposite sides oxidized surface layers which form unilaterally conductive junctions with said mother-metal, a plurality of contact-making layers separate from each other on the respective surface layers on opposite sides of said plate, and means for making electrical connection to said mother-metal.

CARL C. HEIN.